United States Patent Office 2,878,101
Patented Mar. 17, 1959

2,878,101

METHOD FOR RECOVERY OF IRON SULFATE

David H. Reeve, Chicago, Ill., assignor, by mesne assignments, to the United States of America as represented by the United States Atomic Energy Commission No Drawing. Application May 27, 1955
Serial No. 511,754

8 Claims. (Cl. 23—126)

This invention relates to a method of recovering iron and aluminum values from impure phosphate solutions. More particularly, it relates to the recovery of iron, aluminum and $P_2O_5$ values normally lost in precipitates during the purification of phosphate solutions. Still more particularly, it relates to the recovery of aluminum as alumina and iron as iron oxide from the iron phosphate and aluminum phosphate produced when processing so-called leached zone material of the overburden from the phosphate matrix found in the Florida pebble phosphate fields.

Leached zone material is found as a distinct layer between the top cover of humus, sand and clay and the phosphate matrix in the Florida pebble phosphate fields. This material consists largely of a silty to clay-like sand containing components of aluminum, iron, phosphorus and minor values, together with other clays and slimes.

This leached zone material while not a true clay exhibits a porous and generally soft, pliable structure. Mineralogically it consists of quartz, wavellite and perhaps pseudo-wavellite as the major phases. Chemically, it is considered to be a mixture of hydrated aluminum and calcium aluminum phosphate with fine quartz, iron oxide, compounded fluorine and some clay. Also there may be some unleached and partially leached tricalcium phosphate. The following analyses of leached zone material was obtained by averaging analyses obtained from about 200 drill core samples procured over an area of about 36 square miles. The leached zone material averages as follows:

| | Percent |
|---|---|
| $P_2O_5$ | 8.7 |
| $Al_2O_3$ | 8.7 |
| CaO | 6.4 |
| Acid insolubles | 68.7 |

Since the vast percentage of the acid insoluble material is quartz and since it is a coarser particle size than the other materials contained in the material being mined, it has been found advantageous, but not necessary to the invention, to split the ore after suitable comminution, if desired, into one fraction of small particles and another fraction of coarser particles, the split being made at from about 150 mesh up to about 220 mesh after the material has been slurried with water. The fraction containing the particles smaller than this is the valuable fraction, while the fraction containing the particles larger than this is the fraction which is for the most part quartz and is discarded.

In the processing of unsized or sized leached zone material for recovery of the phosphate values, the material with or without a preliminary calcining operation has been digested with various mineral acids such as sulfuric acid or nitric acid or with acid salts such as sodium bisulfate. While solubilizing of leached zone constituents can be accomplished by reacting material to form the counterpart of superphosphate and leaching the mixture with water, it is generally preferred to carry out a reaction whereby a slurry is formed having the water soluble reaction products in the liquid phase.

In the prior processes, the aluminum constituents of the liquid phase or aqueous extract have been precipitated by adding to the solution ammonium sulfate. The alum or ammonium aluminum sulfate precipitated by reaction with ammonium sulfate removes about 70% of the aluminum present in the solution and about 1% of the phosphate. The resultant solution contains about all of the iron, about 99% of the phosphate and about 30% of the aluminum initially present in the aqueous solution. This resultant solution when processed to remove iron and aluminum has always given a product tying up about 70% of the phosphate present in the treated solution, leaving only about 30% of the $P_2O_5$ values for recovery in a useful form, for example, as ammonium phosphate.

It is a primary object of this invention to provide a method which overcomes the shortcomings and disadvantages of processes heretofore in use.

It is another object of this invention to provide a method wherein about 90% of the $P_2O_5$ content of the extract solution is recovered as a useful phosphate.

It is another object of this invention to provide a method wherein substantially all of the aluminum present in solution is separately recovered in the form of crude alum, which material in turn can be converted into a relatively pure alumina.

It is a further object of this invention to provide a method for the recovery of constituents of low economic value fertilizer or waste material precipitates such as iron phosphate and aluminum phosphate in forms having greater economic value.

These and other objects of the invention will be apparent from the following description.

Briefly, the invention comprises precipitating crude alum from impure acidic phosphorus-bearing solutions by addition of an ammonium sulfate material, separating crude alum from the resultant solution, calcining the alum under reducing conditions to produce alumina, treating the resultant solution with an ammonia reactant to precipitate iron and the balance of the aluminum as phosphates, separating the iron and aluminum phosphate from ammonium phosphate liquor, digesting the iron and aluminum phosphate material with sulfuric acid while controlling the sulfate excess and water content to quantities which precipitate predominantly iron sulfate and after separation of the iron sulfate solids recycling the end liquor containing predominantly aluminum sulfate and phosphate constituents for use in a raw material digestion circuit.

More in detail as applied to a preferred embodiment of the invention, the small particle size fraction of leached zone material obtained by splitting the solids at a size of approximately 200 mesh with or without a preliminary calcining treatment is solubilized by reaction with an acid such as sulfuric acid, sulfur dioxide or equivalent materials. In a typical reaction a 200 mesh size fraction in aqueous slurry form having a solids content in the range between about 30% and about 60% is reacted with the sulfuric acid at temperatures in the range between about 60° C. and about 90° C.

Preferably, the digestion is carried out for a period of time ranging between 0.2 and about 6 hours and still more specifically, for a period of about 30 minutes to about 60 minutes, although the length of time may be varied considerably depending upon other variations in reaction conditions. The interdependence of variables makes for vast differences in the specific conditions employed as to each variation. In general, it may be stated the higher the percent acidulation used, the lower the time required. Thus, for example, if about 100% acidulation is used, i. e., about 106.5 pounds of 96% sulfuric acid per 100 pounds of leached zone material, only about 15 minutes is required to accomplish the digestion, while at about 45% acidulation, about 6 hours' digestion is necessary to give good recovery of the desired constituents. Depending upon the analysis of the particular leached zone material processed, between about 30% and about 105% acidulation is desired. This corresponds to the addition of between about 40 pounds and about 150 pounds of sulfuric acid per hundred pounds of leached zone material processed. Preferably, about 65–75% acidulation is used. The percent acidulation referred to in this description is calculated on the basis of the reaction of sulfuric acid with all of the iron, aluminum and calcium or other significant cationic constituents present in the leached zone material. In other words, 100% acidulation would be the addition of that amount of sulfuric acid required to completely react with these components.

After digestion, the aqueous solution of reaction products is separated from the insolubles such as quartz. The solids-free solution is then treated in one of two ways. The solids-free solution may be treated directly with ammonia to precipitate all of the iron and aluminum as iron phosphate and aluminum phosphate. The solution may also be treated with ammonium sulfate, ammonium acid sulfate or mixtures thereof, to precipitate ammonium aluminum sulfate or so-called alum. This precipitation will remove a major portion of the aluminum from solution. After separating the precipitated ammonium alum solids, the solution may be treated with an ammonium reactant, such as gaseous ammonia, ammonium hydroxide, ammonium carbonate and the like.

Upon adjustment of the solution to a pH in the range between about 3.2 and about 4.5, a precipitated product comprising predominantly iron phosphate and aluminum phosphate is formed. The material is separated from solution comprising predominantly ammonium phosphate and ammonium sulfate. This precipitated material is separated from the solution by, for example, filtration and is used for further processing either in a wet or dry form. Material is digested with concentrated sulfuric acid. Wet filter cake carries with it anywhere from 20 to as much as 50% by weight of water.

The amount of sulfuric acid utilized for digestion of iron and aluminum phosphate precipitate may be varied from an amount giving a minimum excess of 20% over that required to form iron sulfate and aluminum sulfate (i. e., 20% over the stoichiometric equivalent amount of acid required for complete conversion of the precipitate) to an amount approximately 350% of the amount required to convert iron and aluminum to sulfates if the solution is to be recycled and the degree of acidulation of leached zone material is to be approximately 70%. Of course, more sulfuric acid can be used if a higher degree of acidulation is desired. The preferred amount of sulfuric acid utilized for conversion of iron and aluminum phosphates to iron and aluminum sulfates is between about 2.5 and about 3.5 times that required for the stoichiometric reaction.

The digest solution is then heated to temperatures in the range between about 120° C. and about 250° C. to concentrate these solutions to an acid strength of about 60% to 75%, i. e., the weight of free sulfuric acid and free phosphoric acid constitutes 60 to 75% of the weight of solution. When digest solution is concentrated to an acid strength in the above range, the water content of the solution for optimum iron precipitation varies from about 20% to about 35%. At acid concentrations in the above range, predominantly iron sulfate is crystallized and most of the aluminum sulfate remains in solution.

After concentration the solution preferably is cooled to a temperature in the range between about 25° C. and about 75° C. because of the difficulty in filtering or otherwise separating solid material from hot sulfuric acid solutions. The temperature of filtration may be as low as room temperature, but in the interest of speed of processing, the solutions generally are cooled to temperatures in the range between about 30° C. and about 90° C. Under the conditions of acid strength and solution concentration predominantly iron sulfate is precipitated. This material may be dried and calcined to recover iron oxide and sulfur dioxide for recycle to the process. The strong acid mother liquor contains some iron, as well as sulfate, phosphate and aluminum constituents. This mother liquor is recycled for mixing with fresh sulfuric acid for acidulation of raw ore or separately added to partially acidified acid rock mixtures.

Crude alum recovered following the ammonium sulfate reaction step is preferably treated in accordance with the invention of my co-pending application, Serial No. 511,752, filed May 27, 1955, now U. S. Patent 2,833,621, entitled, "Method of Preparing Metallurgical Grade Alumina," which process in general deals with dehydration of crude alum at relatively low temperatures until the moles of water of crystallization are reduced to 10 or less, following which the preliminary heat treated material is mixed with coke and calcined under conditions to maintain a reducing atmosphere.

The invention will be further understood by reference to the following example which is given by way of illustration and without any intention that the invention be limited thereto.

*Example*

Leached zone material as mined was classified to recover a minus 200 mesh fraction. This leached zone feed assayed:

| | Percent by weight |
|---|---|
| $P_2O_5$ | 14.7 |
| $Al_2O_3$ | 25.3 |
| $Fe_2O_3$ | 3.1 |
| CaO | 9.2 |
| Acid insolubles | 38.6 |

The minus 200 mesh fraction, as an approximately 30% solids slurry in water is mixed with acidulating medium at approximately 1.0 pound of dry solids per pound of acidulating medium. This medium was made up of .64 pound of 96% sulfuric acid and 0.36 pound of mother liquor produced as hereinafter described, analyzed:

| | Percent by weight |
|---|---|
| $Al_2O_3$ | 5.7 |
| $SO_4$ | 60.5 |
| $Fe_2O_3$ | 0.1 |
| $P_2O_5$ | 17.0 |

The acidified slurry mixture was heated to boiling with constant agitation for 2 hours. The resulting mass was leached countercurrently with water to recover solubilized constituents and the insoluble cake discarded.

Approximately 1.6 pounds of water per pound of dry leached zone feed was used in the countercurrent extraction of the solubilized values from the digestion. An average filtration rate throughout the countercurrent leaching operation of approximately 7 pounds of dry solids per square foot per hour was obtained. The resultant extract at approximately 1.3 specific gravity assayed approximately 4.7% $P_2O_5$, 6.6% $Al_2O_3$, .3% $Fe_2O_3$, and approximately 15.9% sulfate. Overall recoveries in the digesting and leaching circuits were approximately 89% $P_2O_5$, 81% $Al_2O_3$, and 81% $Fe_2O_3$. To this extract when at a temperature of 60° C. is added approximately 0.14 pound ammonium acid sulfate and 0.08 pound ammonium sulfate per pound of extract and the mixture cooled to approximately 20° C. to crystallize the material substantially as ammonium aluminum sulfate, also known as crude ammonium alum. This crystallized alum on a dry basis analyzes approximately 10.5% $Al_2O_3$, 38.4% sulfate, 4% ammonia, 44.8% chemical water, 0.3% $P_2O_5$, about 48.2 pounds of wet crystals, 5% moisture, are recovered per 6.57 pounds of $Al_2O_3$ in the liquor from the leached mineral digest.

The aqueous phase was then processed as follows: to 100 pounds of liquor is added approximately 15 pounds of 28% ammonium hydroxide to adjust the pH range of the aqueous phase to approximately 4.5. The solids formed were removed from solution, washed with water and the recovered material weighing approximately 35 pounds on a dry basis assayed approximately 13.3% $Al_2O_3$, 8.0% $Fe_2O_3$, and 29.6% $P_2O_5$ on a dry basis. The resulting liquor may be processed by fractional crystallization to recover monoammonium phosphate and ammonium sulfate, or any other suitable method for recovery of the $P_2O_5$ values left in the liquor.

The solids recovered from the ammonium phosphate liquor were mixed with approximately 32 pounds of 96% sulfuric acid. The water content of the digest solution was approximately 33% by weight. The solution was heated to a temperature of approximately 150° C. for approximately 2 hours and the resultant solution cooled for about 1 hour to a temperature of approximately 75° C. The solids were filtered from the concentrated acid solution. Analyses of the solid and liquid products were as follows:

|  | Solids, percent | Liquor, percent |
|---|---|---|
| $P_2O_5$ | 11.0 | 17 |
| $SO_4$ | 60.4 | 60.5 |
| $Al_2O_3$ | 4.2 | 5.7 |
| $Fe_2O_3$ | 9.8 | 0.1 |
| $H_2O$ about | 1.0 | 20.2 |

The solids were dried in an electric oven at a temperature of approximately 200° C., and calcined at a temperature of approximately 1000° C. The calcined product analyzed:

Percent by weight
$P_2O_5$ ----------------------------------- 42.5
$SO_4$ ------------------------------------ 1.0
$Fe_2O_3$ --------------------------------- 37.6
$Al_2O_3$ --------------------------------- 16.2

Mother liquor was recycled as hereinbefore explained.

Losses of phosphates in the iron sulfate product can be reduced by increasing the quantity of sulfuric acid utilized for digestion of iron and aluminum phosphate cake. If the amount of sulfuric acid added at this stage is sufficient, the $P_2O_5$ content of the calcined product can be lowered to about 10%, in which event, the free acid content of the mother liquor may be sufficient for acidulation of the ore without separate sulfuric acid addition.

Having thus described my invention, what I claim is:

1. The method of separating iron from a mixture of phosphate salts of iron and aluminum which comprises digesting said phosphate salts with sulfuric acid in an amount in excess of about 120% of the stoichiometric proportion required for reaction, whereby said phosphate salts are dissolved, concentrating the resulting solution to a water content between about 20% and about 35% by weight, whereby predominantly iron sulfate solids are crystallized from solution, and separating said iron sulfate solids from the aqueous mother liquor.

2. The method of claim 1 wherein the amount of sulfuric acid is between about 120% and 350% of the stoichiometric proportion required for reaction.

3. The method of claim 1 wherein siad resulting solution is heated to a temperature in the range between about 120° C. and about 250° C., and then cooled to a temperature in the range between about 30° C. and about 90° C. prior to separation of said iron sulfate solids.

4. In a method of recovering aluminum and phosphate values from leached zone material which comprises digesting leached zone material in sulfuric acid, leaching the water soluble reaction products with an aqueous medium selected from the group consisting of water and a dilute aqueous solution of the products obtained by reacting leached zone material with sulfuric acid, adding to the leached solution a sulfate of ammonia to precipitate ammonium aluminum sulfate, separating said precipitate from the resulting solution, adding an ammonia reactant selected from the group consisting of gaseous ammonia, ammonium hydroxide, and ammonium carbonate to the resultant solution to precipitate phosphate salts of iron and aluminum, separating said salts from the resulting ammonium phosphate solution, and recovering solid ammonium phosphate from said ammonium phosphate solution, the improvement which comprises digesting said phosphate salts of iron and aluminum in sulfuric acid in an amount in excess of about 120% of the stoichiometric proportion required for reaction, whereby said phosphate salts are dissolved, concentrating the solution containing reaction products of the digestion to a water content between about 20% and about 35% by weight, whereby predominantly iron sulfate solids are crystallized from solution, separating said iron sulfate solids from the aqueous mother liquor, and recycling said aqueous mother liquor to said leached zone digestion step.

5. The method of claim 4 wherein the amount of sulfuric acid is between about 120% and about 350% of the stoichiometric proportion required for reaction.

6. The method of claim 4 wherein said solution containing reaction products of the digestion of phosphate salts of iron and aluminum is heated to a temperature in the range between about 120° C. and about 250° C., and then cooled to a temperature in the range between about 30° C. and about 90° C. prior to separation of said iron sulfate solids.

7. A process for separately recovering iron, aluminum, and phosphate values from leached zone material which comprises reacting leached zone material with an acidulating medium comprising essentially iron sulfate mother liquor from a subsequent step in the process and a sufficient quantity of sulfuric acid to provide on a combined basis about 65 to 75% acidulation of the leached zone material, leaching the acidulated mixture with water, adding to the resulting solution a sulfate of ammonia to precipitate a major proportion of the aluminum values as ammonium alum, separating the precipitate, adding to the liquid phase an ammonia reactant selected from the group consisting of gaseous ammonia, ammonium hydroxide, and ammonium carbonate in a quantity sufficient to adjust the pH of said liquid phase to between about 3.2 and about 4.5, whereby the iron and aluminum values are precipitated in the form of phosphate salts, separating the solid and liquid phases, the latter containing predominantly ammonium phosphate and ammonium sulfate, dissolving the solids by digestion with sulfuric acid in a quantity at least about 20% in excess of the stoichiometric amount required for reaction with said solids, concentrating the resulting acidic solution to a water content between about 20 and about 35% by weight, whereby the iron values therein crystallize selectively as iron sulfate, removing the iron sulfate from the resulting slurry, and recycling the iron sulfate mother liquor to react with an additional quantity of leached zone material.

8. A process as in claim 7 wherein said iron sulfate mother liquor contains a sufficient quantity of sulfuric acid to effect approximately 70% acidulation of said leached zone material.

(References on following page)

References Cited in the file of this patent

UNITED STATES PATENTS

| | | |
|---|---|---|
| 24,931 | Genth | Aug. 2, 1859 |
| 110,084 | Spence | Dec. 13, 1870 |
| 1,070,300 | Spence et al. | Aug. 12, 1913 |
| 1,103,115 | Washburn | July 14, 1914 |
| 1,843,779 | McWhorter | Feb. 2, 1932 |
| 2,005,120 | Whetzel et al. | June 18, 1935 |
| 2,416,508 | Barnes et al. | Feb. 25, 1947 |
| 2,467,271 | Peer | Apr. 12, 1949 |
| 2,551,944 | Hoff | May 8, 1951 |
| 2,616,790 | Swindin | Nov. 4, 1952 |
| 2,662,812 | Shaw | Dec. 15, 1953 |
| 2,767,046 | Piros | Oct. 16, 1956 |
| 2,769,686 | McCullough et al. | Nov. 6, 1956 |